(12) United States Patent
Alston

(10) Patent No.: US 7,478,681 B2
(45) Date of Patent: Jan. 20, 2009

(54) LAWN MOWER ROLLER ATTACHMENT

(76) Inventor: Charles D. Alston, 6 Patton La., Sicklerville, NJ (US) 08081

( * ) Notice: Subject to any disclaimer, the term of this patent is extended or adjusted under 35 U.S.C. 154(b) by 0 days.

(21) Appl. No.: 11/896,672

(22) Filed: Sep. 5, 2007

(65) Prior Publication Data
US 2008/0053672 A1    Mar. 6, 2008

Related U.S. Application Data

(60) Provisional application No. 60/842,390, filed on Sep. 6, 2006.

(51) Int. Cl.
*A01B 45/00* (2006.01)
*A01B 45/02* (2006.01)
(52) U.S. Cl. .................................................. 172/21
(58) Field of Classification Search .............. 172/21, 172/22, 1, 123, 42, 540, 604, 52; 37/242; D15/13, 27; 56/17.4, DIG. 5, DIG. 9, DIG. 20, 56/17.1, 17.2, 13.7
See application file for complete search history.

(56) References Cited

U.S. PATENT DOCUMENTS

| | | | | |
|---|---|---|---|---|
| 2,032,784 | A * | 3/1936 | Worthington | 56/7 |
| 2,231,821 | A * | 2/1941 | Sprouse | 56/249 |
| 2,258,061 | A | 10/1941 | Krenzke | |
| 2,260,801 | A * | 10/1941 | Clemson | 56/249 |
| 2,483,846 | A * | 10/1949 | Roche et al. | 56/249 |
| 2,660,018 | A * | 11/1953 | Clemson | 56/249 |
| 2,667,026 | A * | 1/1954 | Ingram | 56/249 |
| 2,722,795 | A * | 11/1955 | Warner | 56/249 |
| 2,730,856 | A | 1/1956 | Mekalainas | |
| 2,902,099 | A * | 9/1959 | Yafjack | 172/554 |
| 2,912,813 | A | 11/1959 | Ellsworth | |
| 2,954,836 | A * | 10/1960 | Cavanaugh | 180/343 |
| 3,106,812 | A * | 10/1963 | McDonagh | 56/320.1 |
| 3,247,812 | A | 4/1966 | Lucaino et al. | |
| 3,260,042 | A * | 7/1966 | Hanson et al. | 56/249 |
| 3,402,535 | A * | 9/1968 | Nelson | 56/320.1 |

(Continued)

FOREIGN PATENT DOCUMENTS

GB    2 160 401    12/1985

OTHER PUBLICATIONS

"Lawn Aerator attachment for Garden Tiller", Vibrant Yard Company, LLC, http://www.lawn-aerator-attachment.com/, 7 pages printed from the Internet on Jun. 17, 2006.

*Primary Examiner*—Árpád Fábián-Kovács
(74) *Attorney, Agent, or Firm*—Richard C. Litman

(57) ABSTRACT

The lawn mower attachment provides a combination of lawn roller accessories and a spreader, the combination being attached to the rear of a self-propelled lawn mower. A frame that includes a pivotally connected roller suspension member is attached to the rear of a self-propelled lawn mower via a series of attachment brackets. The roller suspension member can be retracted when not in use. A super-retracted position is available for removal and replacement of the roller. Various style rollers are provided to enable a user to perform aeration, de-thatching, leveling, plugging, and the like. A roller extension member can provide an extra wide path of roller operation. Handle and control extensions are provided for compatibility of the lawn mower attachment with the existing lawn mower. Weights can be added over the rear wheels of the lawn mower to facilitate effective soil penetration of the roller attachment during operation.

15 Claims, 7 Drawing Sheets

U.S. PATENT DOCUMENTS

| | | | |
|---|---|---|---|
| 3,528,508 A | 9/1970 | Stevenson | |
| 3,555,793 A * | 1/1971 | Chapman | 56/17.4 |
| 3,948,026 A * | 4/1976 | Whitechester | 56/255 |
| D254,306 S | 2/1980 | Carter | |
| 4,192,387 A | 3/1980 | Stinson | |
| 4,481,757 A | 11/1984 | Tsuchiya | |
| 4,541,230 A | 9/1985 | Huerter | |
| D281,693 S | 12/1985 | Doering | |
| 4,616,714 A * | 10/1986 | Lister | 172/21 |
| 4,638,622 A * | 1/1987 | Smith | 56/17.4 |
| 4,899,828 A * | 2/1990 | Harris | 172/21 |
| 5,020,602 A | 6/1991 | Dellinger | |
| 5,101,910 A * | 4/1992 | Dawson | 172/27 |
| 5,553,380 A * | 9/1996 | Rice | 29/895.2 |
| 5,586,604 A * | 12/1996 | Postema | 172/21 |
| 5,611,291 A | 3/1997 | Pogue | |
| 5,613,565 A | 3/1997 | Kelly | |
| 5,870,888 A * | 2/1999 | Pugh | 56/16.7 |
| 6,047,530 A * | 4/2000 | Bednar | 56/6 |
| 6,131,377 A | 10/2000 | Rice et al. | |
| 6,347,593 B1 | 2/2002 | Moran et al. | |
| 6,415,872 B2 | 7/2002 | Myers et al. | |
| 6,523,335 B2 * | 2/2003 | Vanderipe | 56/16.7 |
| 6,631,608 B1 * | 10/2003 | Eykelkamp | 56/15.6 |
| D485,850 S * | 1/2004 | Anderson | D15/17 |
| 6,712,155 B1 | 3/2004 | Dufty | |
| 6,732,500 B1 * | 5/2004 | Myers | 56/17.2 |
| D498,484 S * | 11/2004 | Anderson | D15/17 |
| D499,434 S * | 12/2004 | Anderson | D15/17 |
| 6,832,657 B1 | 12/2004 | LaFlair | |
| D510,364 S | 10/2005 | Wessel | |
| 6,962,039 B2 * | 11/2005 | Greenhoe | 56/16.7 |
| 6,993,894 B2 * | 2/2006 | Greenhoe | 56/16.7 |
| 7,237,374 B2 * | 7/2007 | Sugden et al. | 56/249 |
| 7,373,768 B2 * | 5/2008 | Sugden et al. | 56/249 |

* cited by examiner

LAWN MOWER ROLLER ATTACHMENT

CROSS-REFERENCE TO RELATED APPLICATION

This application claims the benefit of U.S. Provisional Patent Application Ser. No. 60/842,390, filed Sep. 6, 2006.

BACKGROUND OF THE INVENTION

1. Field of the Invention

The present invention relates to lawn care machinery, and particularly to a lawn mower attachment that provides a combination of soil conditioning rollers and a spreader that can be attached to the rear of a self-propelled lawn mower.

2. Description of the Related Art

Self-propelled lawn mowers are popular and have very good maneuverability in tight areas. Aerators are devices having soil-penetrating tines that, in some cases, are mounted on the front of mechanized lawn equipment. This configuration has proved useful for riding lawn mowers. However, a substantial number of lawn mowers existing in the field are self-propelled, walk-behind lawn mowers. Until the present invention there has not been a combination soil conditioner and spreader that can attach at the rear of a self-propelled walk-behind lawnmower.

Thus, a lawn mower attachment solving the aforementioned problems is desired.

SUMMARY OF THE INVENTION

The lawn mower attachment provides a combination of lawn roller attachments and a spreader, the combination being attached to the rear of a self-propelled lawn mower. A frame that includes a pivotally connected roller suspension member is attached to the rear of a self-propelled lawn mower via a series of attachment brackets. The roller attachment member can be retracted when not in use. A super-retracted position is available for removal and replacement of the roller. Various style rollers are provided to enable a user to perform aeration, de-thatching, leveling, plugging, and the like. A roller extension member can provide an extra wide path of roller operation. Handle and control extensions are provided for compatibility of the lawn mower attachment with the existing lawn mower. Weights can be added over the rear wheels of the lawn mower to facilitate effective soil penetration of the roller attachment during operation.

These and other features of the present invention will become readily apparent upon further review of the following specification and drawings.

Figure 1:
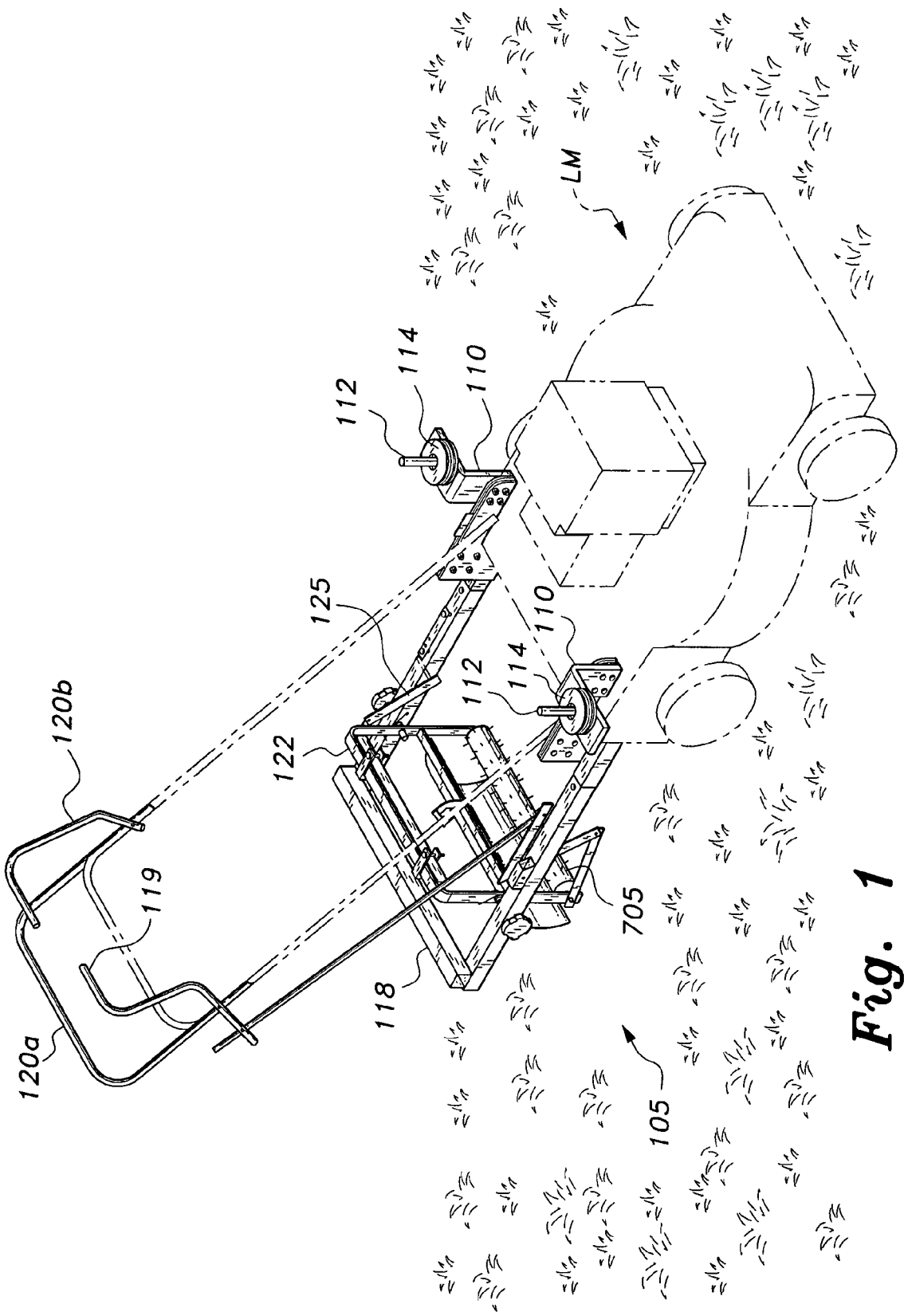
FIG. 1 is an environmental, perspective view of a lawn mower attachment according to the present invention.

7G is a perspective view of a cultivator roller according to the present invention.

Similar reference characters denote corresponding features consistently throughout the attached drawings.

DETAILED DESCRIPTION OF THE PREFERRED EMBODIMENT

Figure 2:
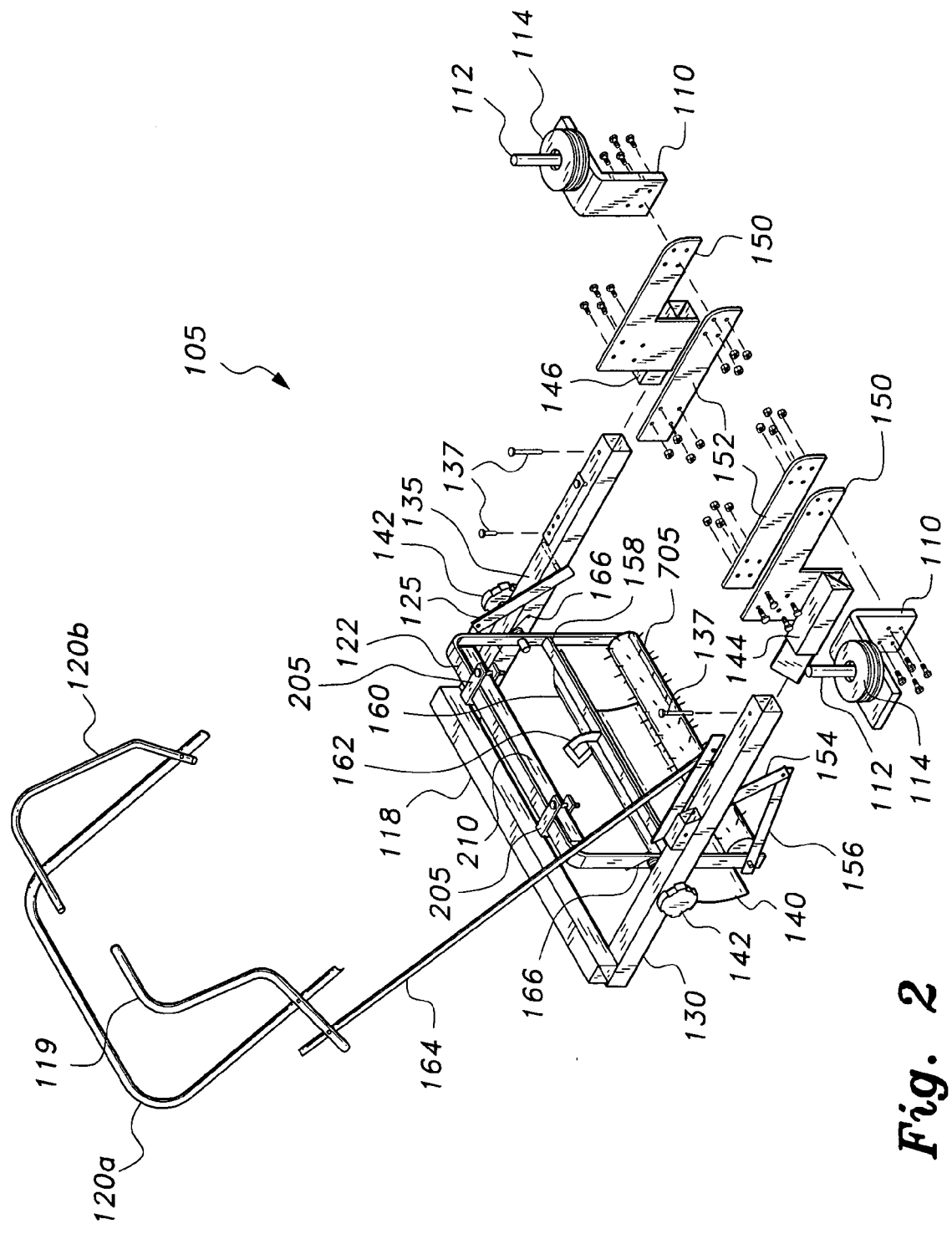
FIG. 2 is a partially exploded, perspective view of the lawn mower attachment according to the present invention.
Figure 6:
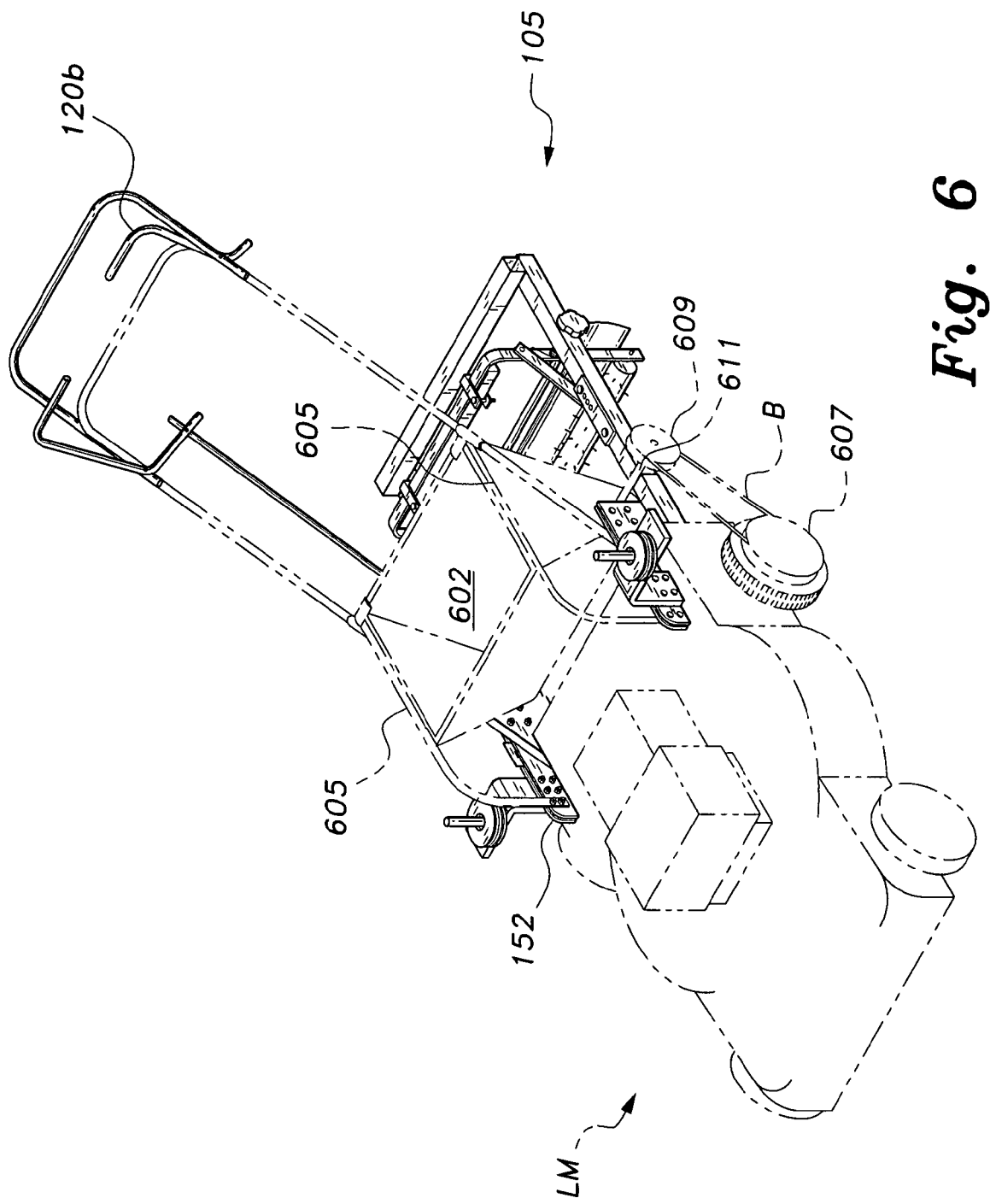
FIG. 6 is a perspective view of the lawn mower attachment, showing the spreader configuration according to the present invention.

As shown in FIG. 1, the present invention is a lawn mower attachment 105 that is attached to the rear of a self-propelled lawn mower LM. The attachment 105 can provide a combination of lawn roller accessories, such as spike roller 705, and, as shown in FIG. 6, a spreader 602, the combination being attached to the rear of a self-propelled lawn mower LM. Referring to FIGS. 1 and 2, a frame that includes a pivotally connected roller suspension member 122 is attached to the rear of a self-propelled lawn mower via a series of attachment brackets, such as L-brackets 150 and I-brackets 152.

The frame includes pivotal support for a roller linkage assembly 155 and a stop linkage assembly 125, both linkage assemblies being pivotally attached to the roller suspension member 122. The frame may be of a unitary construction or may comprise a plurality of frame members, such as rear, square tubular, lateral frame member 118, roller linkage supporting, square tubular, longitudinal frame member 130, and stop linkage supporting, square tubular, longitudinal frame member 135.

The roller suspension member 122 is a substantially U-shaped member that is reinforced by a cross member 158, which is attached approximately midway a total length of leg formations of the U-shaped roller suspension member 122. Free ends of the U-shaped roller suspension member 122 provide removable attachment points for a rotating roller, such as aerating roller 705, or similar roller attachment, as shown in FIGS. 7A through 7G.

The roller suspension member 122 has a laterally extending pivotal mount to the frame members 130 and 135 a predetermined distance in front of lateral frame member 118. The pivotal mount of roller suspension member 122 is provided by gimbal knobs 142. The gimbal knobs 142 have shafts that extend through frame members 130 and 135 and are received by torsion springs 166 and the roller suspension member 122. The gimbal knobs 142 may be retained in position by cotter pins (not shown), at the end of the gimbal knob shafts. Torsion springs 166 are disposed to provide opposing spring biases to the roller suspension member 122 so that when the roller suspension member 122 is rotated to an operational position in a plane approximately perpendicular to the plane of the frame members 130, 135, the suspension member 122 is biased to continue to rotate in a clockwise direction. However, continued rotation is stopped by counteraction of the stop linkage assembly 125, which, when in the raised position, as shown in FIGS. 1 and 2, cannot pivot any further, thereby functioning to lock the roller suspension member 122 in the operational position. Weights 210 may be attached to the roller suspension member 122 opposite the spike roller 705 by means of clamps 205 in order to counterbalance the additional weight of roller attachments.

Conversely, when the roller suspension member 122 is rotated to a retracted position in a plane approximately parallel to the plane of the frame members 130, 135, the suspension member 122 is biased to continue to rotate in a counter-clockwise direction. However, continued rotation is stopped by counteraction of the stop linkage assembly 125, which, when in the lowered position, rests against frame member 135 to prevent further pivoting of the stop link 125, which functions to lock the roller suspension member 122 in the retracted position. Preferably, the stop link 125 can be removably attached to the roller suspension member 122. When the attachment of stop link 125 is removed from the suspension member 122, the suspension member 122 can be rotated into the super-retracted position, raising the roller attachment above the horizontal plane, thus enabling a user to more easily remove and replace roller attachments, such as aerator attachment 705.

Additionally, bracket slide members 146 and 144 are attached, i.e., bolted or welded, to L-brackets 150 and can be slid into or, alternatively, slid over longitudinal frame members 130 and 135 on either lateral side of the device 105 and bolted in place with bolts 137 to affix the device 105 to the rear of the lawn mower LM.

Figure 5:
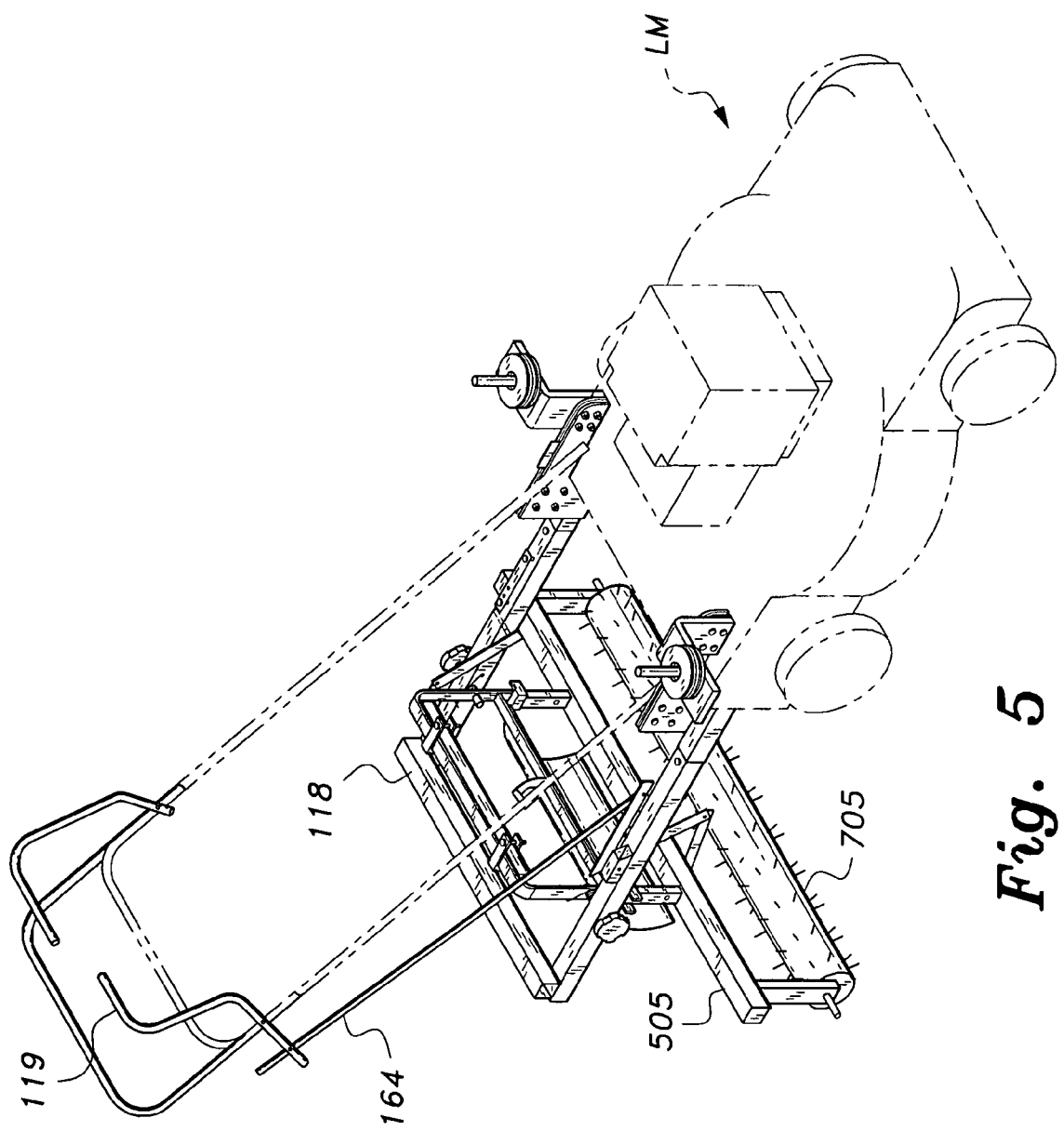
FIG. 5 is a perspective view of the lawn mower attachment showing an extended embodiment of the roller assembly according to the present invention.

The roller suspension member 122 can be retracted when not in use. The super-retracted position is available for removal and replacement of the roller, e.g., roller 705. Various style rollers are provided to enable a user to perform aeration, de-thatching, leveling, plugging, and the like. As shown in FIG. 5, a roller extension member 505 can be attached to the ends of U-shaped roller suspension member 122 to provide an extra wide path of roller operation.

Handle and control extensions are provided for compatibility of the lawn conditioning mower attachment with the existing lawn mower. Handle extension 120a can be slid onto a lawn mower's tubular handle supports. Control 119 is pivotally disposed on the handle extension 120 to provide control of the roller position, i.e., engaged or retracted, via elongated roller link control arm 164 and the z-roller linkage assembly 155. The z-roller linkage assembly 155 comprises solid V-shaped member 154 pivotally connected at one end to elongate link member 156. The opposing end of elongate link member 156 is pivotally connected to an end of U-shaped roller suspension member 122.

Figure 3:
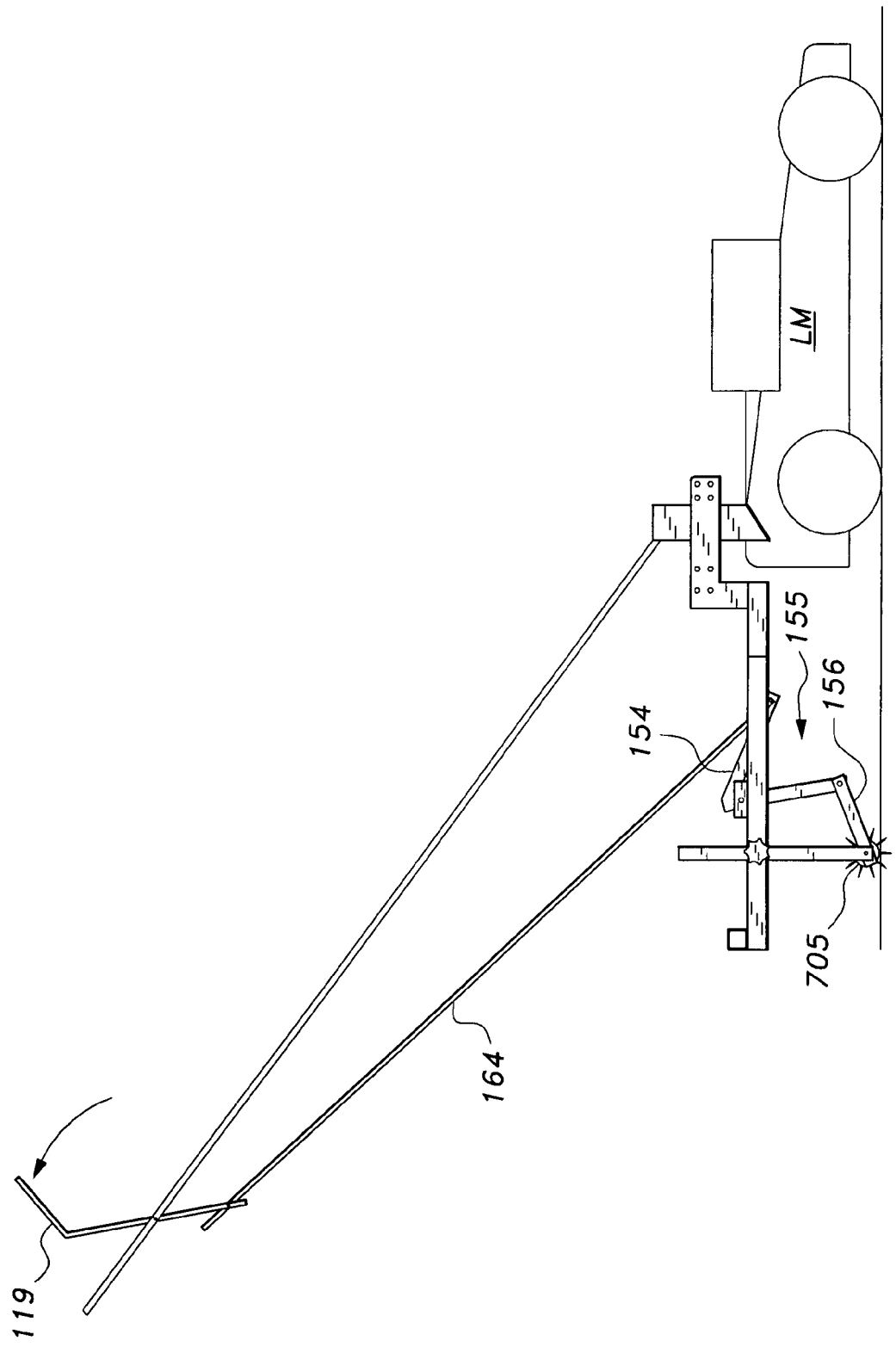
FIG. 3 is a side view of the lawn mower attachment showing the spike roller in operating position according to the present invention.
Figure 4:
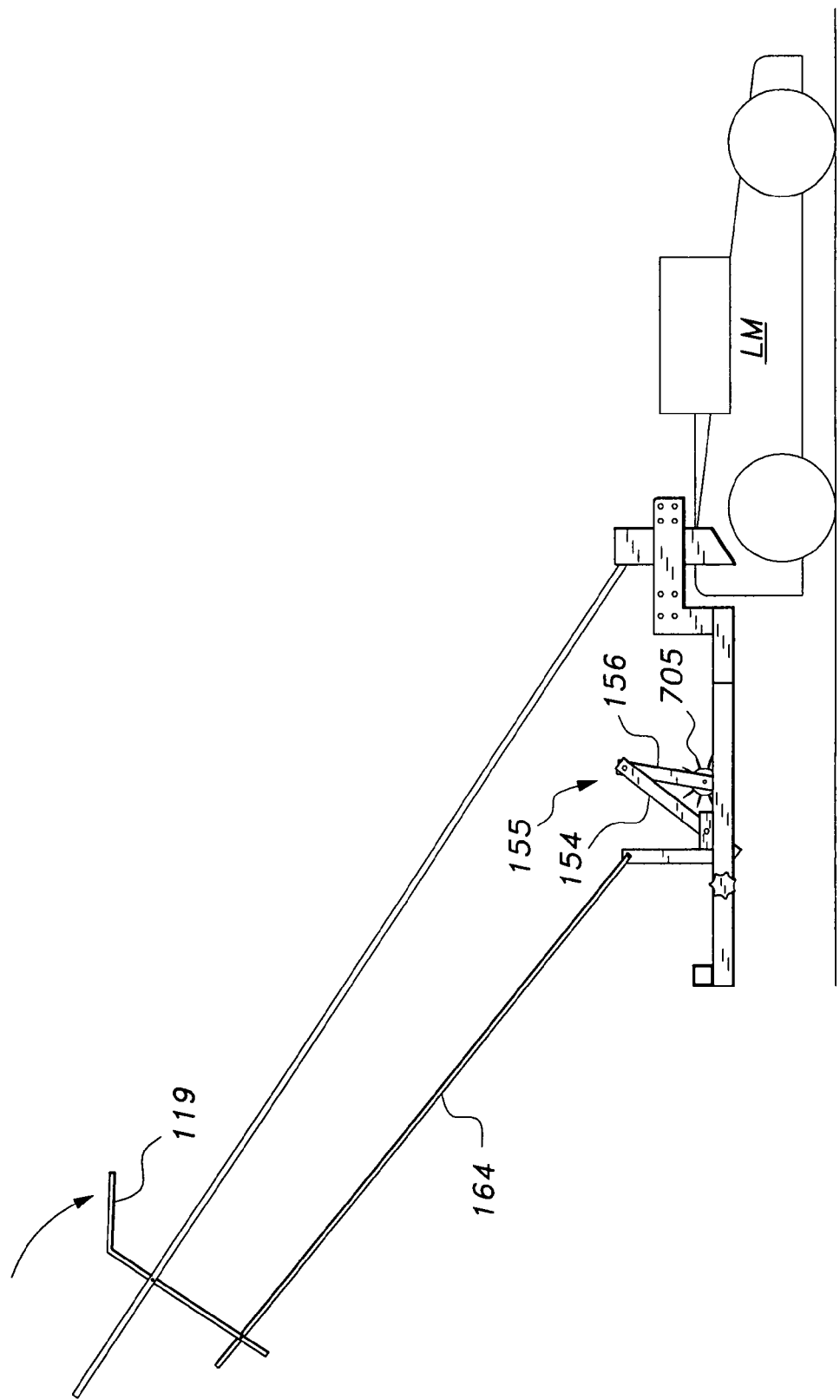
FIG. 4 is a side view of the lawn mower attachment showing the spike roller in a retracted position according to the present invention.

Along the same leg of the Vee 154 as the pivotal connection to elongate link member 156, the Vee 154 is pivotally connected to frame 130. The end of the opposing leg of the Vee 154 is pivotally attached to control arm 164. Thus, as shown in FIG. 3, pushing control 119 towards handle 120a acts on the z-linkage 155 to extend the roller extension member 122 into the operational position. Conversely, as shown in FIG. 4, pulling control 119 away from handle 120a acts on the z-linkage 155 to retract the roller extension member 122 into a stowage, i.e., retracted position. On the opposite side of handle extension 120a is a clutch control 120b, which is attached to an existing clutch control arm (not shown) of the lawn mower LM.

Brackets 110 are connected to attachment bracket 150 and attachment bracket 152 to provide a support for lawn mower weights 114. As shown in FIG. 2, L-bracket 150 has an arcuate leading edge. Similarly, I-bracket 152 has a matching arcuate leading edge. Both pairs of attachment brackets 150 and attachment brackets 152 have matching through bores proximate to their arcuate leading edges.

Pairs of L-shaped weight brackets 110 have matching through bores drilled into a lower portion of a vertical section of the weight brackets 110. Through bores of the attachment brackets 150, the attachment brackets 152, proximate their arcuate leading edges can be aligned with matching through bores in the vertical sections of the weight brackets 110 so that the entire assembly of L-brackets 150, I-brackets 152, and weight brackets 110 can be fastened together onto the rear section, preferably to existing tubular support brackets, of the lawn mower LM by a plurality of bolts and nuts.

Extending from a horizontal section of each of the weight brackets 110 is a weight attachment boss 112. The lawn mower weights 110 can be slidably attached to the weight brackets 110 via the weight attachment boss 112 to add weight over the rear wheels of the lawn mower LM thereby producing a downward force on the device 105 to facilitate effective soil penetration of the roller attachment 705 during operation.

As most clearly shown in FIGS. 1 and 2, an arcuate shaped debris guard 140 may be removably attached to the cross member 158. The debris guard 140 is suspended at its upper end 160 by hook attachment 162 to the cross member 158. The debris guard 140 extends laterally across the roller suspension member 122 to provide a barrier that prevents debris that may be kicked up by action of roller 705 from reaching a user who is walking behind the lawn mower LM. Optionally, the debris guard 140 may be further extended to touch the ground by the addition of a rubberized flap (not shown).

As shown in FIG. 6, the spreader 602 can be supported on the lawn mower LM by spreader attachment members 605. Ends of spreader attachment members 605 can be attached to a respective I-bracket 152. Each attachment member 605 has an arcuate bend as it extends away from I-bracket 152. The arcuate bend of attachment member 605 provides a horizontal support section of the member 605 for the attachment of the spreader 602, the horizontal support extending rearward of the lawn mower LM. Lateral sides of spreader 602 rest on a respective horizontal support section of spreader attachment members 605.

A spreader mechanism shaft 611 extends laterally to coincide with a plane that is nearly parallel to a plane that belt flange 607 resides in, the belt flange being attached to a rear wheel of the lawn mower LM. Free end of the spreader mechanism shaft 611 is connected to sheave 609. A belt B is suspended between sheave 609 and belt flange 607. Forward motion of the lawn mower LM rotates the flange 607-belt B-sheave 609-shaft 611 assembly to cause the spreader to dispense its contents.

Figure 7B:
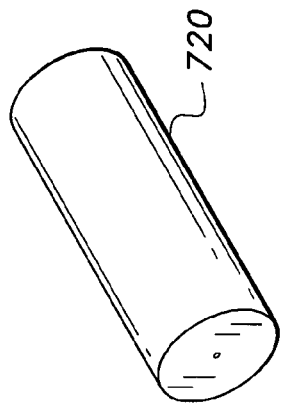
FIG. 7B is a perspective view of an aerator roller according to the present invention.
Figure 7E:
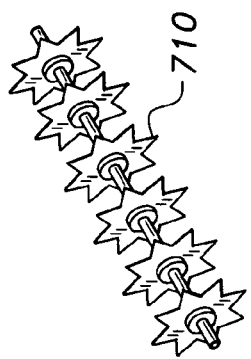
FIG. 7E is a perspective view of a thatch roller according to the present invention.
Figure 7A:
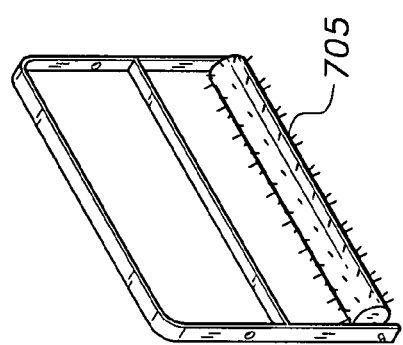
FIG. 7A is a perspective view of a spike roller according to the present invention.
Figure 7D:
FIG. 7D is a perspective view of a cork roller according to the present invention.
Figure 7C:
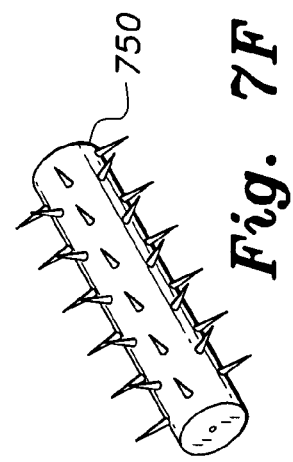
FIG. 7C is a perspective view of a lawn roller according to the present invention.
Figure 7F:
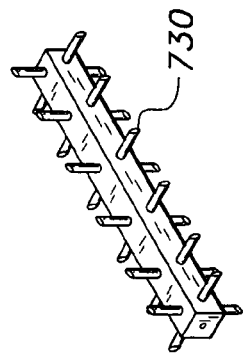
FIG. 7F is a perspective view of a plug roller according to the present invention.
Figure 7G:
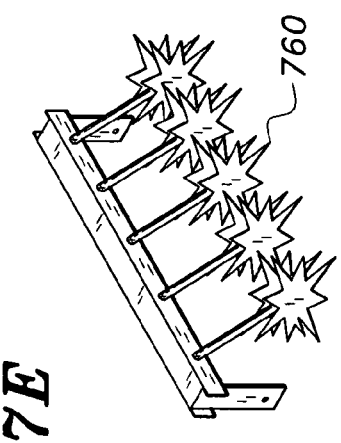

As shown in FIGS. 7A through 7G, a variety of roller attachments can be attached to the roller suspension member 122. FIG. 7A shows a spike roller. The spike roller may comprise sharp pointy members such as nails driven through one or more concentric PVC tubes. FIG. 7B shows star wheeled aerator roller 710 having a plurality of star points and connected to a roller shaft. FIG. 7C shows a plain roller device 720. FIG. 7D shows a cork roller 730 that can be made of a rectangular tubular lateral member with round tubular cross members being disposed at lateral intervals along the lateral member. FIG. 7E depicts a combination spike and spring loaded thatch roller 740. FIG. 7F illustrates a plug roller 750. FIG. 7G shows a cultivator roller 760.

It is to be understood that the present invention is not limited to the embodiment described above, but encompasses any and all embodiments within the scope of the following claims.

I claim:

1. A lawn mower attachment for a self-propelled lawnmower, comprising:
   a frame having a rear end, and two sides extending forward therefrom;
   brackets attached to forward ends of the two sides, the brackets being adapted for removable attachment to a rear portion of the self-propelled lawn mower;
   weight brackets adapted for attachment over rear wheels of the lawn mower, the weight brackets having a weight attachment boss for removable attachment of weights above the wheels;
   a U-shaped roller suspension member extending laterally between the two sides of the frame, the suspension member being pivotally attached to the two sides;
   a lawn conditioning roller, the lawn conditioning roller being removably attachable to ends of the U-shaped roller suspension member;
   torsion springs disposed between the frame side members and the U-shaped suspension member to provide a bias to keep the suspension member locked in an operable position when the suspension member is extended substantially perpendicular to the frame sides, the torsion springs also providing a bias to keep the suspension member locked in a retracted position when the suspension member is retracted to a position substantially parallel to the frame sides; and
   a control arm pivotally connected to the suspension member, the control arm being operable by a user to extend the suspension member to the operational position to engage the lawn conditioning roller to the ground, and, alternatively, to retract the suspension member to a stowage position to disengage the lawn conditioning roller from the ground.

2. The lawn mower attachment according to claim 1, wherein the forward end brackets further comprise right and left side L-brackets attached to right and left side I-brackets, the L-brackets having laterally extending bracket slide members for attachment to the frame.

3. The lawn mower attachment according to claim 2, wherein said weight brackets are attached to the left and right L- and I-bracket combination.

4. The lawn mower attachment according to claim 1, a roller linkage assembly, the roller linkage assembly pivotally attaching said U-shaped roller suspension member to the two sides of said frame.

5. The lawn mower attachment according to claim 1, wherein the frame is of unitary construction.

6. The lawn mower attachment according to claim 1, further comprising a pivoting stop member attached to said roller suspension member for limiting pivotal travel of said roller suspension member within said frame.

7. The lawn mower attachment according to claim 6, wherein said pivotal stop member is removable so that said roller suspension member is movable to a super-retracted position to facilitate easy removal and replacement of roller attachments.

8. The lawn mower attachment according to claim 1, wherein said U-shaped roller suspension member has opposing elongated legs, said roller suspension member further comprising a cross member extending between the legs about halfway along the length of the legs for reinforcement of said U-shaped roller suspension member.

9. The lawn mower attachment according to claim 1, further comprising a gimbal knob and shaft disposed through each said torsion spring, the gimbal shaft extending through said roller suspension member to pivotally connect said suspension member and said frame.

10. The lawn mower attachment according to claim 1, wherein said U-shaped roller suspension member comprises a bight and legs extending from opposing ends of the bight, said suspension member further comprising a counterbalancing weight disposed across the bight.

11. The lawn mower attachment according to claim 1, further comprising a roller extension member extending laterally beyond opposing sides of the U-shaped roller suspension member in order to provide an extra wide path of roller operation.

12. The lawn mower attachment according to claim 1, further comprising:
   a z-linkage pivotally attached to said U-shaped roller suspension member; and
   an operator control extension lever pivotally attached to the z-linkage, the lever and z-linkage extending the roller suspension member during lawn conditioning operations when in a first position and retracting the roller suspension member when pivoted to a second position.

13. The lawn mower attachment according to claim 1, further comprising a debris guard attached to said frame, the debris guard extending laterally behind the roller.

14. The lawn mower attachment according to claim 2, further comprising:
   a spreader bin having a spreader mechanism shaft;
   elongated arcuate attachment members, the arcuate attachment members being attachable to the I-brackets and extending rearward, being adapted for attachment to lawnmower handle extensions, the spreader bin being attachable to the arcuate attachment members so that the spreader bin is disposed laterally between the arcuate attachment members;
   a bin sheave extending from the spreader mechanism shaft of the spreader bin;
   a wheel sheave adapted for positioning on at least one wheel of the lawn mower; and
   a belt extending between the bin sheave and the wheel sheave;
   wherein contents of the spreader bin are automatically dispensed to the ground during rolling motion of the lawnmower wheel.

15. The lawn mower attachment according to claim 1, wherein said roller comprises a roller selected from the group consisting of a spike roller, a star-wheeled aerator roller, a plain roller, a cork roller, a combination spike and spring-loaded thatch roller, a plug roller, and a cultivator roller.

* * * * *